B. B. SCHAFER.
POLYPHASE CHOKING COILS FOR RECTIFIERS.
APPLICATION FILED JULY 14, 1920.
1,413,685.
Patented Apr. 25, 1922.
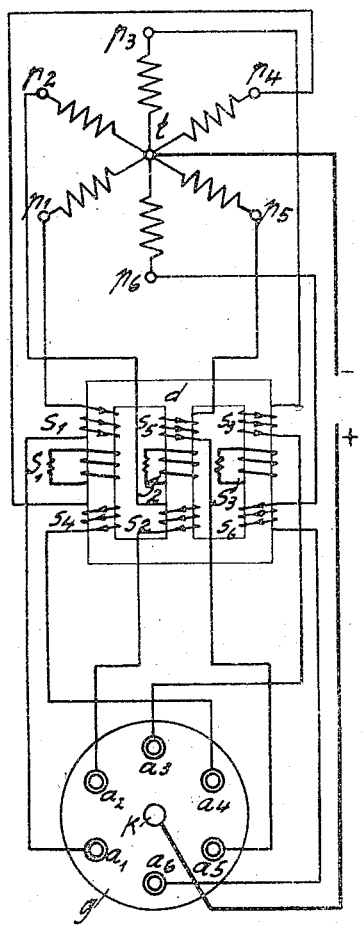
Inventor
B. B. Schäfer
By H. R. Kerslake
Attorney

UNITED STATES PATENT OFFICE.

BÉLA BENÖ SCHÄFER, OF BADEN, SWITZERLAND, ASSIGNOR TO GLEICHRICHTER-AKTIENGESELLSCHAFT, OF GLARUS, SWITZERLAND.

POLYPHASE CHOKING COILS FOR RECTIFIERS.

1,413,685.  Specification of Letters Patent.  Patented Apr. 25, 1922.

Application filed July 14, 1920. Serial No. 396,298.

*To all whom it may concern:*

Be it known that I, BÉLA BENÖ SCHÄFER, a citizen of the German Realm, residing at No. 39 Schartenstrasse, Baden, Switzerland, have invented certain new and useful Improvements in Polyphase Choking Coils for Rectifiers, of which the following is a specification.

As is well known, the parallel connection of a plurality of anodes of a mercury vapour rectifier can be safely effected by connecting choking coils in series therewith. In order to counteract the rise of voltage which otherwise occurs with increasing loads, either a single choking coil may be connected in series with each anode, or the same iron core may carry as many coils as there are alternating current phases. In the case of a six-phase rectifier, six anode coils $s_1$—$s_6$ (see the figure) may for instance be mounted upon an iron framing $d$ with three pillars; in each case it being preferable to place the coils having the greatest difference in voltage upon the same pillar. In the case of a parallel connection of a plurality of rectifiers, as many such six-phase choking coils are to be used as there are rectifiers to be operated at one and the same time.

It has been found that in order to effect the parallel connection with a sufficient degree of safety, the voltage drop caused by the choking coils must be made comparatively large. The object of the present invention is to reduce the voltage drop on the direct current side without reducing the degree of safety as regards parallel working and is attained according to the present invention by providing additional coils $S_1$ $S_2$ $S_3$ in addition to the usual anode coils $s_1$—$s_6$ carrying the phase currents. We find the closed additional windings on the choking coil cores oppose any change in the field and therefore cause the flattening of the curve of the continuous current, which reduces the voltage drop on the continuous current side. Any irregularities which may occur during the parallel working of the rectifiers have a much smaller frequency and are therefore hardly damped down at all so that the choking coil acts favourably with regard to the parallel working and at the same time causes a reduction in the voltage drop on the continuous current side. These additional coils may either be short-circuited or be closed independently over a suitable ohmic or induction free resistance; thus they do not carry directly the anode currents. The effect of the additional closed windings, viz., the safe reduction of the essential voltage drop cannot be obtained by means such as the weakening of the main choking coils.

In the figure of the accompanying drawings: $t$ is the $n$-phase alternating current supply, for instance for six phases $p_1$—$p_6$; $g$ is the rectifier with the anodes $a_1$—$a_6$ and the cathode $k$.

The herein described arrangement of the additional choking coil may be employed with any desired number of phases, and can also be used with advantage in rectifiers of any type where choking coils have to be included in the several phase leads.

What I claim is:—

Regulating apparatus for the parallel connection of a plurality of mercury vapour rectifier anodes including a polyphase source of energy, a mercury rectifier with a plurality of anodes, connections between the respective phases of the source of energy and the anodes of the rectifier, each of said connections including a choking coil, a magnetic core for said coils and separate additional coils in inductive relation to the said choking coils and circuits of said additional coils including respectively a non-inductive resistance.

In testimony whereof I have signed my name to this specification.

BÉLA BENÖ SCHÄFER.